UNITED STATES PATENT OFFICE.

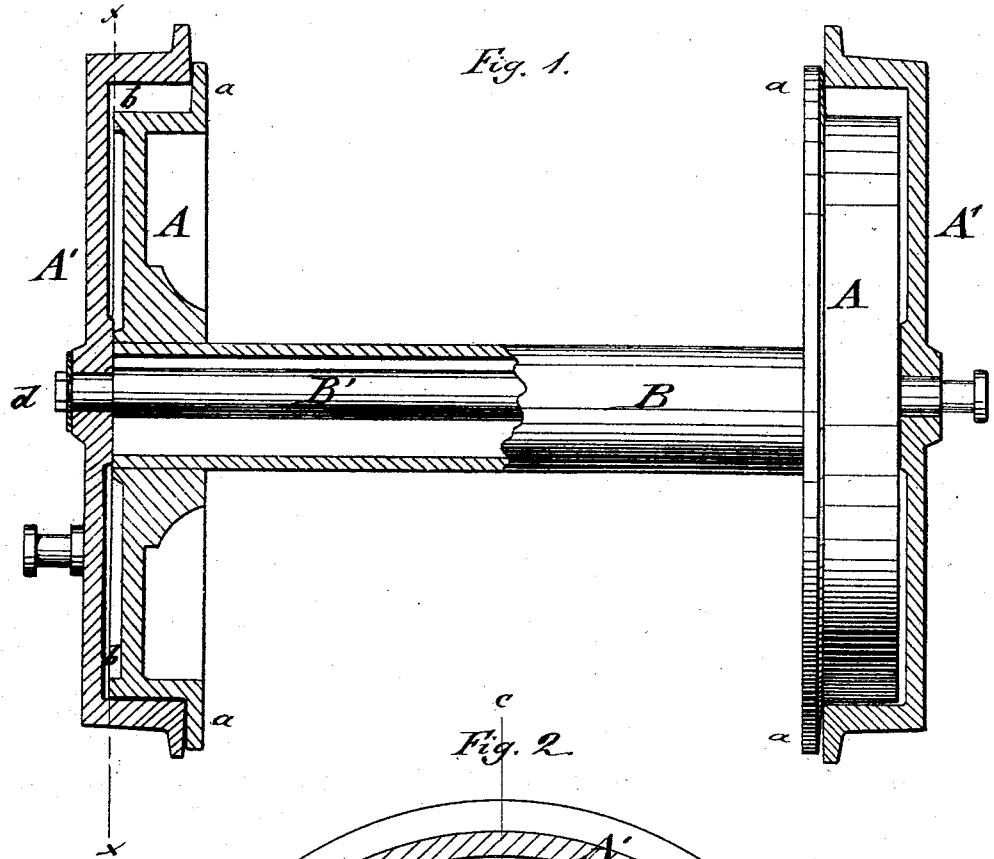

JOSEPH C. WILSON, OF OSHKOSH, WISCONSIN, ASSIGNOR TO HIMSELF AND MAHLON P. BARRY, OF SAME PLACE.

IMPROVEMENT IN LOCOMOTIVE DRIVING-WHEELS.

Specification forming part of Letters Patent No. 146,854, dated January 27, 1874; application filed August 9, 1873.

*To all whom it may concern:*

Be it known that I, JOSEPH C. WILSON, of Oshkosh, in the county of Winnebago and State of Wisconsin, have invented a new and Improved Locomotive Driving - Wheel, of which the following is a specification:

In the accompanying drawing, Figure 1 represents a vertical transverse section on the line $c\ c$, Fig. 2, of my improved locomotive driving-wheel; and Fig. 2, a side elevation of the same, partly in section, on the line $x\ x$, Fig. 1.

Similar letters of reference indicate corresponding parts.

The object of my invention is to construct for locomotives an improved driving-wheel, by which the traction is greatly increased, so that heavier grades may be ascended, and a greater amount of freight be drawn, besides adding to the strength of the locomotive-axles, preventing slipping of the wheels, and dispensing with the use of sand and sand-boxes.

My invention consists in a driving-wheel formed of an inner and an outer wheel, of which the former sustains the weight of the locomotive on its hollow shaft and revolves along the inside of the tire of the outer wheel, whose solid shaft passes through the hollow outer shaft.

In the drawing, A represents the inner wheel, which is keyed on the hollow shaft B, on which the weight of the engine rests. The loose tire A, being the driving-wheel proper, is keyed to the solid shaft B', which passes through the hollow shaft B. The outer wheel A' is connected, in the customary manner, by suitable gearing, with the other parts of the engine. The inner wheel A revolves on the inner surface of the tire of the loose wheel A', the powerful friction producing a clamp-like action on the loose wheel, between rail and inner wheel, so that it cannot slip on the track. The projecting flange $a$ of the inner wheel runs closely along that of the outer wheel, and prevents the entering and accumulating of snow and other substances between the wheels. A face-rim, $b$, of the inner wheel, together with suitable washer and nut-bolt attachment $d$ of the solid shaft, produces the intimate fitting of the flanges of both wheels.

The addition of the hollow shaft adds greatly to the strength of the locomotive-axle, and the working of the inner wheel in the outer increases the driving power considerably by economizing in the wear and tear of the tire, and otherwise.

Having thus described my invention, I claim as new and desire to secure by Letters Patent—

The combination of two drive-wheels, consisting of sections A A', with an axle, B', and a circumjacent tubular axle, B, as and for the purpose described.

JOSEPH C. WILSON.

Witnesses:
  M. H. SHELF,
  E. H. DANFORTH.